United States Patent
Tham et al.

(10) Patent No.: US 8,700,760 B2
(45) Date of Patent: Apr. 15, 2014

(54) METHOD AND SYSTEMS FOR REDUNDANT SERVER AUTOMATIC FAILOVER

(75) Inventors: Jeffrey Tai-Sang Tham, Quincy, MA (US); Michael F. Ryan, Stoughton, MA (US)

(73) Assignee: GE Fanuc Intelligent Platforms, Inc., Charlottesville, VA (US)

( * ) Notice: Subject to any disclaimer, the term of this patent is extended or adjusted under 35 U.S.C. 154(b) by 807 days.

(21) Appl. No.: 12/193,537

(22) Filed: Aug. 18, 2008

(65) Prior Publication Data

US 2010/0042715 A1 Feb. 18, 2010

(51) Int. Cl.
*G06F 15/173* (2006.01)

(52) U.S. Cl.
USPC .......................................... 709/224

(58) Field of Classification Search
USPC .......................................... 709/224
See application file for complete search history.

(56) References Cited

U.S. PATENT DOCUMENTS

| | | | |
|---|---|---|---|
| 5,842,125 A | 11/1998 | Modzelesky et al. | |
| 6,058,307 A | 5/2000 | Garner | |
| 6,243,580 B1 | 6/2001 | Garner | |
| 6,743,396 B2 * | 6/2004 | Wagner et al. | 420/534 |
| 6,961,753 B1 | 11/2005 | Osburn, III | |
| 2001/0012775 A1 | 8/2001 | Modzelesky et al. | |
| 2004/0006624 A1 * | 1/2004 | Hawkinson et al. | 709/227 |
| 2004/0006652 A1 | 1/2004 | Prall et al. | |
| 2004/0153700 A1 * | 8/2004 | Nixon et al. | 714/4 |
| 2006/0056285 A1 | 3/2006 | Krajewski, III et al. | |
| 2006/0059478 A1 | 3/2006 | Krajewski, III et al. | |
| 2006/0069946 A1 | 3/2006 | Krajewski, III et al. | |
| 2007/0198709 A1 | 8/2007 | Hawkinson et al. | |
| 2007/0198724 A1 | 8/2007 | Hawkinson et al. | |
| 2008/0114872 A1 | 5/2008 | Fisher et al. | |

FOREIGN PATENT DOCUMENTS

| | | |
|---|---|---|
| CN | 1527169 A | 9/2004 |
| CN | 101232395 A | 7/2008 |
| GB | 2410573 A | 8/2005 |
| WO | 2008044810 A1 | 4/2008 |

OTHER PUBLICATIONS

Patent Cooperation Treaty, International Search Report for Application No. PCT/US2009/054036, Jun. 4, 2010, 5 pages.
Patent Cooperation Treaty, Written Opinion of the International Searching Authority for Application No. PCT/US2009/054036, Jun. 4, 2010, 5 pages.
Search Report from CN Application No. 2009801324363 dated Apr. 25, 2013.

* cited by examiner

*Primary Examiner* — Maceeh Anwari
(74) *Attorney, Agent, or Firm* — Global Patent Operation; Mark A. Conklin

(57) ABSTRACT

A method and systems for a redundant server automatic failover system is provided. The system includes a plurality of client devices communicatively coupled to a network wherein the plurality of client devices each includes an active server identification location. The system also includes a first server system communicatively coupled to the network that is configured to operate as the active server on the network wherein messages sent to the first server system are addressed to the first server system using the active server identification location on each client device. The system further includes a second server system communicatively coupled to the network that is configured to operate as a standby server on the network and is configured to switch to being the active server on the network when it is determined that the first server system is unable to operate as the active server.

17 Claims, 2 Drawing Sheets

|  | SCADA State | Partner SCADA State | Action |
|---|---|---|---|
| Startup | | | |
| | Standby | Unknown | Switch to Active |
| | Standby | Active | Do Nothing |
| | Standby | Standby | Arbitration |
| Run Time | | | |
| | Standby | Unknown | Switch to Active |
| | Standby | Active | Do Nothing |
| | Standby | Standby | Arbitration |
| | Active | Unknown | Do Nothing |
| | Active | Active | Arbitration |
| | Active | Standby | Do Nothing |
| Shut Down | | | |
| | Standby | Unknown | Do Nothing |
| | Standby | Active | Do Nothing |
| | Standby | Standby | Do Nothing |
| | Active | Unknown | Do Nothing |
| | Active | Active | Do Nothing |
| | Active | Standby | Switch to Standby then Shut Down |
| Switching to Active | | | |
| | Standby | Unknown | Switch to Active |
| | Standby | Active | Tell Partner to Switch to Standby then Switch to Active |
| | Standby | Standby | Switch to Active |
| | Active | Unknown | Do Nothing |
| | Active | Active | Tell Partner to Switch to Standby |
| | Active | Standby | Do Nothing |
| Switching to Standby | | | |
| | Standby | Unknown | Do Nothing |
| | Standby | Active | Do Nothing |
| | Standby | Standby | Tell Partner to Switch to Active |
| | Active | Unknown | Do Nothing - FAIL the Request |
| | Active | Active | Switch to Standby |
| | Active | Standby | Tell Partner to Switch to Active then Switch to Standby |

FIG. 2

METHOD AND SYSTEMS FOR REDUNDANT
SERVER AUTOMATIC FAILOVER

BACKGROUND OF THE INVENTION

This invention relates generally to process control networks and, more particularly, to systems and a method for automatic failover of redundant servers in a process control network.

At least some known process control networks include a plurality of HMI clients connected to a pair of redundant SCADA servers via Local Area Networks (LAN). One SCADA server is in control as an active server while the other SCADA server is in standby mode. The data between the SCADA servers are synchronized. When the active server fails or is disconnected from the network for various reasons, the standby SCADA switches to the active role. The plurality of HMI clients need to switch to the newly active SCADA server to query and process the process data with minimal interruption. One of the problems with redundant schemes is that each client needs to have a connection to the active SCADA server of the logical pair. In such known networks, to maintain continuous connection to the active SCADA server, a custom script or application running on each HMI client polls the status of the SCADA server pair and switches between them when the active connection failed. However, such polling increases the computational overhead of each of the HMI clients and causes increased traffic on the network. Additionally, managing custom scripts or applications at the HMI client introduces a probability of configuration errors and compatibility issues.

BRIEF DESCRIPTION OF THE INVENTION

In one embodiment, system for a redundant server automatic fail-over system includes a plurality of client devices communicatively coupled to a network wherein the plurality of client devices each includes an active server identification location. The system also includes a first server system communicatively coupled to the network that is configured to operate as the active server on the network wherein messages sent to the first server system are addressed to the first server system using the active server identification location on each client device. The system further includes a second server system communicatively coupled to the network that is configured to operate as a standby server on the network and is configured to switch to being the active server on the network when it is determined that the first server system is unable to operate as the active server. The active server identification location is configured to receive an active server identification when the first server system is unable to operate as the active server.

In another embodiment, a method for automatic failover includes operating a first server system as an active server on a network wherein the first server system is configured to communicate with a plurality of clients. Messages sent to the first server system are addressed to the first server system using an active server identification location on the sending client. The method also includes operating a second server system as a standby server on the network, switching the second server to being the active server on the network when it is determined that the first server system is unable to operate as the active server, and changing the active server identification location on the plurality of clients to the identification of the second server system.

In yet another embodiment, a redundant server system includes a network, a first server system communicatively coupled to said network operable as an active server on said network, a second server system communicatively coupled to said network operable as a standby server on said network, and a plurality of clients communicatively coupled to said network, at least some of the plurality of clients comprising an active server identification location containing an identification of the active server on the network. The second server system is configured to switch to being the active server and at least one of the plurality of clients is programmed to receive a message including an identification of the active server and to change the active server identification location associated with that client using the message.

BRIEF DESCRIPTION OF THE DRAWINGS

FIGS. 1 and 2 show exemplary embodiments of the method and systems described herein.

FIG. 1 is a schematic block diagram of a redundant server system 100 in accordance with an exemplary embodiment of the present invention; and FIG. 2 is a table that illustrates a response of the server status manager shown in FIG. 1 in various operational activities.

DETAILED DESCRIPTION OF THE INVENTION

Figure 1:
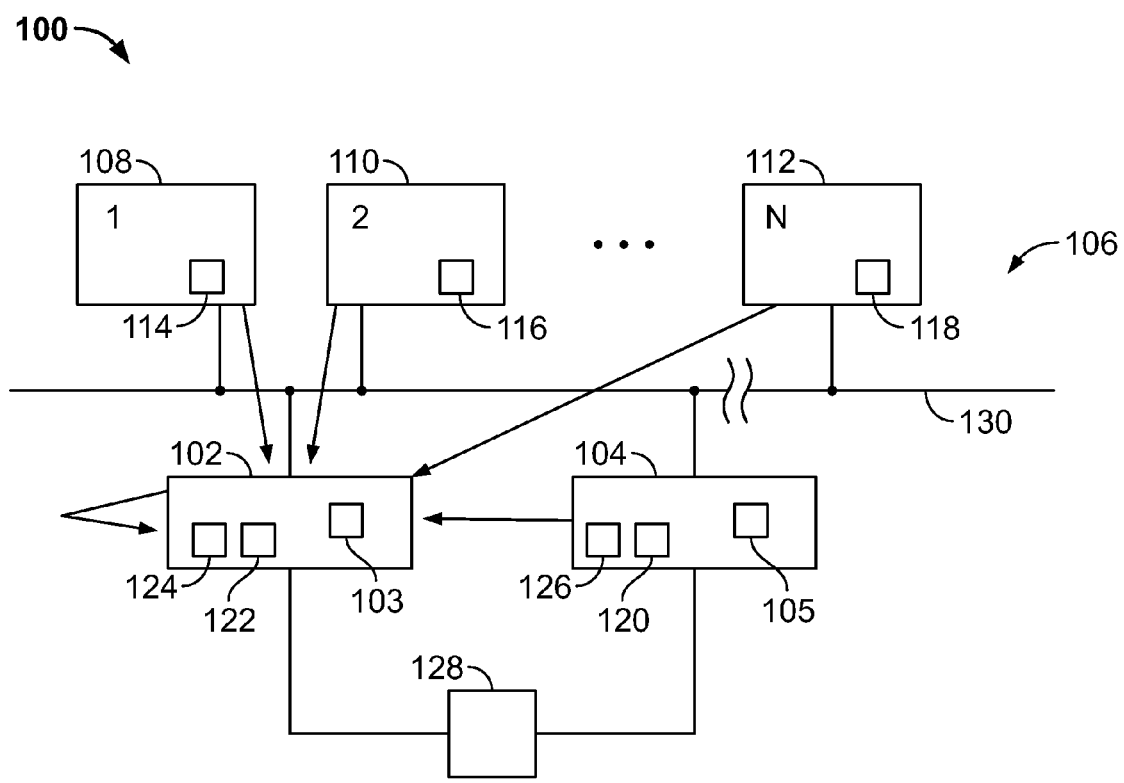

The following detailed description illustrates embodiments of the invention by way of example and not by way of limitation. It is contemplated that the invention has general application to redundant control systems in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

FIG. 1 is a schematic block diagram of a redundant server system 100 in accordance with an exemplary embodiment of the present invention. In the exemplary embodiment, a first server 102 of a redundant pair of servers operates in an active mode. First server 102 includes a processor 103. A second server 104 in the redundant pair of servers operates in a standby mode. Second server 104 includes a processor 105. A plurality of view nodes 106 such as Human-Machine Interfaces (HMI) includes a first view node 108, a second view node 110, and an Nth view node 112. Each of the plurality of view nodes 106 directs communications to active server 102 based on an identification of active server 102 held in a respective active server identification location 114, 116, and 118 stored within each of the plurality of view nodes 106. Standby server 104 also directs communications to active server 102 based on an identification of active server 102 held an active server identification location 120 stored within standby server 104. In addition active server 102 includes an active server identification location 122 that also stores an identification of active server 102 as the active server.

In the exemplary embodiment, each of the plurality of view nodes 106 and servers 102 and 104 includes active server 102 in their respective active server identification locations. Accordingly, active server 102 is referred to as the master and standby server 104 is referred to as the slave. All nodes such as plurality of view nodes 106 and servers 102 and 104 should point to the master, in the exemplary embodiment, server 102. Nodes that do not point to the master or include an identification of active server 102 in their respective active server identification location may not receive all the first failover logic module 124 services available from active server 102 or the services may be delayed. For example, standby server 104 operating as the slave does not run an I/O driver but is getting database synchronization from active server 102, which operates as the master, consequently data read from standby server 104 may not be the most current. The nodes pointing to the salve cannot write data to or configure the slave. Additionally, because the slave is not running a module referred to as scan, alarm, and control (SAC) the node will not receive any new alarms. The SAC program is responsible for looking through the process database and deciding what locations need to be updated and when.

Further, nodes that direct communications to and subsequently receive communications from the slave may not receive up to date information regarding changes to for example, setpoint changes when a user makes a setpoint change to active server 102. Moreover, information entered by the user may not update an alarm file of active server 102 if the view node from which it was entered is pointing to standby server 104.

To ensure all nodes point to the master or active server 102, active server 102 pulls view nodes to it. On failover and at a predetermined time period and/or event the master pulls all view nodes to itself To pull one of the plurality of view nodes 106 to active server 102, active server 102 tells the view node failover to active server 102. Active server periodically checks the active connections of view nodes 106 and writes the identification of the active server for each view node 106 that is not connected to active server 102.

Such a failover connection between view nodes 106 and active server 102 of the logical pair is fast and automatic for the user in that view nodes 106 are pulled by active server 102 to communicate with it rather than each view node 106 having to poll servers 102 and 104 to determine which is the current active server and then having to switch itself to the new active server 102 in the event of a failover. The active server pulling each of the plurality of view nodes 106 facilitates minimizing configuration errors, eliminating the need for custom scripts or applications, and providing maximum availability.

Having the scada server "pull clients" to it when the server status becomes active permits retrofitting the automatic failover using software executing on the servers rather than software and hardware on the plurality of view nodes 106. The active failover also facilitates minimizing the amount of time that view nodes 106 attempt to retry communications to the newly disabled or disconnected server.

Servers 102 and 104 each maintain a list of HMI clients or view nodes 106 having active connections to server 102. When standby server 104 is assigned an active status, the now active server 104 cycles through the client list and switches the logical connection on each to the newly active server. In the exemplary embodiment, the logical connections are switched sequentially. In an alternative embodiment, the logical connections are switched simultaneously using for example, but not limited to a broadcast message. The newly active server creates a bi-directional connection back to each view node 106, verifies which server the view node is connected to, and calls a remote procedure to set the logical connection to the newly active server.

A first failover logic module 124 executes on server 102. A second failover logic module 126 executes on server 104. Likewise, when more servers are present each may execute a respective failover logic module. Each of the plurality of view nodes 106 executes logic that causes each to failover on connection loss to the master or active server 102. If one of the plurality of view nodes 106 loses a connection to the master, view node 106 fails to the slave or standby server 104. The view node logic may be disabled by modifying a configuration field. Additionally, a view node 106 may be manually or programmatically failed to point at slave. View node 106 fails back to master within a predetermined time period as first failover logic module 124 pulls all view nodes 106 to it on a periodic or event driven cycle. A server status manager 128 monitors redundant server system 100 to determine a status of at least one of the operating and connected servers on a network 130. Typically, all servers that are operating and connected to network 130 are either in a standby or an active mode. However, the status of a server that is not connected but operating, a server that is shutdown, or server with a loss of power may be determined to be in an unknown state.

Additionally, view nodes 106 execute logic that periodically reads network status display (NSD) fields on servers 102 and 104 to determine which server is the master. The NSD fields are a collection of numeric and ASCII values that are used to view various information on network status. View node 106 ensures it is pointing to the master by writing the identification of the determined active server into the respective active server identification location.

During startup, each server determines whether it is operating as active server 102 or standby server 104. Each server then builds an easy data access (EDA) group for further processing. EDA is an application programming interface layer used to access real-time process data. An EDA group is a reference to one or more data locations that are read as a group. If the server determines it is operating as the master or active server 102, at a predetermined time period or predetermined event, server 102 sets its own active server identification location to itself, for each connection that is at least incoming (could be both incoming and outgoing) server 102 either transmits its own server identification to each of the connected view nodes' active server identification location or requests the view nodes to transmit the server location in each view nodes' active server identification location. In the exemplary embodiment, reading of the EDA is sequential. In an alternative embodiment, reading of the EDA is parallel.

If the server determines it is operating as the slave or standby server 104, at a predetermined time or event, server 104 determines the identification of the master if necessary and then writes the identification of the master into its own active server identification location thereby saving the master from having to write its identification into the slave's own active server identification location.

During a manual failover, first failover logic module 124 writes the identification of the slave into the slave's active server identification location 120 and into the master's active server identification location 122. The master then drops offline or is switched to being the slave and the slave assumes the role of master. The master (formerly slave) transmits its identification to the plurality of view nodes 106 to pull them into communication with the new master. The identification is written into each respective active server identification location 114, 116, and 118 for each connected view node 106. Any new view nodes 106 can connect to either server 102 or 104, but will be pulled to the master at the first predetermined time period when the master pulls all view nodes to itself.

During a loss of power to the master, second failover logic module 126 determines that active server 102 can no longer serve as the master and switches standby server 104 to an active mode. View nodes 106 connected to active server 102 automatically failover to the new master either by network timeout logic executing on view nodes 106 or by second failover logic module 126 pulling each view node 106 to the new active server. All connected view nodes 106 then request a boot queue update. The boot queue is a list of current alarms that occurred prior to view node 106 connected to server 102. When a view node 106 re-connection occurs, view nodes 106 request active server 102 to re-send the current active alarms. The boot queue is sent to view nodes 106 so any current alarms can be displayed.

If a connection between one or more of the plurality of view nodes 106 and the master are lost, the affected view nodes failover to the slave if it is present. If the affected view nodes can only connect to the slave, the affected view nodes will maintain the connection to the slave because there is no logic on the affected view node or the slave to cause the affected view node to connect to another server. The logic in first failover logic module 124 that executes the pullover of the view nodes 106 executes only on the master. If the master doesn't pull the affected view nodes to itself the slave will not affect the connection of the affected view nodes to itself. If the affected view nodes reconnect to master, first failover logic module 124 on master will pull the affected view nodes back to itself. By connecting to the slave when a connection to the master is lost the affected view nodes have access to data that is relatively old depending upon the synchronism rate between the slave and the master. If any of the plurality of view nodes 106 loses a connection to the slave, there will be no effect on the operation of the plurality of view nodes 106 until a failover occurs. In such a case, the effect on the plurality of view nodes 106 is similar to the loss of connection to the master described above after the failover.

FIG. 2 is a table that illustrates a response of server status manager 128 (shown in FIG. 1) in various operational activities. In the exemplary embodiment, server status manager 128 monitors the servers connected to network 130 and determines whether each server is in an active mode, a standby mode, or an unknown state. In the active mode, view nodes 106 connect the data session to the active server 102. The active server SAC processes the database blocks. In the standby mode, the standby server 104 SAC is in standby mode (does not process the database blocks) and active server 102 updates the database (in memory) on the standby server 104. Server status manager 128 also provides for switching the status of a server to facilitate reducing conflicts between servers. For example, if more than one server is active, each will continually try to pull view nodes 106 to itself increasing the computational overhead experienced by each view node 106 as they comply with first one server pulling it and then the next server pulling it. When the server partners are both running in the same mode, an arbitration procedure is used to determine which one should be the Active node. When server status manager 128 requests the status from the servers, part of the status response includes an indication of whether the server is configured as a primary node. If both servers agree on which one is the primary node, the primary node becomes active. If both servers do not agree on which is the primary node, an alternate method, for example, a server name string comparison is performed, and the server having a lower ASCII value in its server name string becomes active.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processors 103 and 105, or processors executing on view nodes 106 including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is having a newly active server of a redundant server pair use an existing network connection to create a dynamic (bi-directional) connection to one or more clients and sending a command to each client to switch the logical connection to the newly active server. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and systems for automatic failover of redundant servers in a process control network provides a cost-effective and reliable means for having a newly active server of a redundant server pair use an existing network connection to create a dynamic (bi-directional) connection to one or more clients and sending a command to each client to switch the logical connection to the newly active server. More specifically, the method and systems described herein facilitate ensuring minimal disruption in the operation of the process controlled by the active server. In addition, the above-described method and systems facilitate upgrading existing system because there is no code modification to older versions of the client required to implement the automatic failover as the software resides on the servers or may reside on an external system. Furthermore, the method and systems described herein facilitate reducing client computational overhead because the clients do not have to periodically discover which server is currently the active server. As a result, the method and systems described herein facilitate automatic failover of redundant servers in a process control network in a cost-effective and reliable manner.

While the disclosure has been described in terms of various specific embodiments, it will be recognized that the disclosure can be practiced with modification within the spirit and scope of the claims.

What is claimed is:

1. A redundant server automatic fail-over system comprising:
a plurality of client devices communicatively coupled to a network, said plurality of client devices comprising an active server identification location that is configured to receive communication from a server that authenticates the server as active;
a first server system communicatively coupled to the network, said first server system configured to operate as the active server on the network, the first server system configured to communicate with the plurality of client devices using a first communication protocol, the first server system further configured to send a signal to the plurality of client devices authenticating the first server system as the active server such that messages sent from any one of the plurality of client devices to the active server are addressed to the first server system using the active server identification location on each client device that is using the first communication protocol; and a second server system communicatively coupled to the network, said second server system configured to operate as a standby server on the network, said second server system configured to switch to being the active server on the network when it is determined that the first server system is unable to operate as the active server, the second server system further configured to send a second signal to the plurality of client devices authenticating the second server system as the active server such that messages sent from any one of the plurality of client devices to the active server are addressed to the second server system using the active server identification location on each client device.

2. A system in accordance with claim 1 further comprising a dedicated communication link wherein said first server system is communicatively coupled to said second server system using said dedicated communication link.

3. A system in accordance with claim 2 wherein said first server system is configured to update said second server system using said dedicated communication link when said second server system is operating as the standby server.

4. A system in accordance with claim 1 wherein said first server system is configured to update said second server system when said second server system is operating as the standby server.

5. A system in accordance with claim 1 further comprising a failover detector configured to determine when the active server is in a failover condition.

6. A method for automatic failover comprising:
identifying a first server system as an active server on a network;
sending a signal from the first server system to a plurality of clients, the signal authenticating the first server system as the active server such that messages sent to the active server from the plurality of clients are addressed to the first server system using an active server identification location on each of the plurality of clients;
identifying a second server system as a standby server on the network;
switching the second server from the standby server to the active server on the network when it is determined that the first server system is unable to operate as the active server;
sending a second signal from the second server system to the plurality of clients, the second signal authenticating the second server system as the active server such that messages sent to the active server from the plurality of clients are addressed to the second server system using the active server identification location on each of the plurality of clients; and
changing the active server identification location on the plurality of clients to an identification of the second server system as the active server.

7. A method in accordance with claim 6 further comprising restarting the first server system as a standby server.

8. A method in accordance with claim 6 wherein the second server system is communicatively coupled to the first server system other than through the network, said method further comprising updating the second server system when the second server system is operating as the standby server from the first server system.

9. A method in accordance with claim 6 wherein switching the second server to being the active server comprises sensing a failover condition in the first server system.

10. A method in accordance with claim 6 wherein switching the second server to being the active server comprises determining by the second server system that the first server system is in a failover condition.

11. A method in accordance with claim 6 wherein the second server system is communicatively coupled to the first server system through a dedicated link, said method further comprising determining by the second server system that the first server system is in a failover condition using the dedicated link.

12. A method in accordance with claim 6 wherein changing the active server identification location on a client to the identification of the second server system as the active server comprises initiating changing the active server identification location on a plurality of clients to the identification of the second server system.

13. A method in accordance with claim 6 wherein changing the active server identification location on a client to the identification of the second server system comprises changing the active server identification location on a plurality of clients to the identification of the second server system as the active server using a broadcast message.

14. A method in accordance with claim 6 further comprising composing a message by one or more of the plurality of clients to the active server using the active server identification location.

15. A redundant server system comprising:
a network;
a first server system communicatively coupled to said network, said first server system operable as an active server on said network;
a plurality of clients communicatively coupled to said network, the plurality of clients comprising an active server identification location containing an identification of the first server system as the active server on the network; and
a second server system communicatively coupled to said network, said second server system operable as a standby server on said network until a failure of the first server system to be operable as the active server occurs, wherein said second server system is configured to switch to being the active server when the failover occurs, the second server system further configured to send a signal to the plurality of client devices that authenticates the second server system as the active server such that messages sent from any one of the plurality of client devices to the active server are addressed to the second server system using the active server identification location on each client device.

16. A system in accordance with claim 15 further comprising a server monitor wherein said server monitor is configured to:
determine a status of at least said first and said second servers wherein the status relates to the functioning of said first and said second servers operating as the active and standby servers; and
transmit a message to said at least some of the plurality of clients indicating a change in the active server.

17. A system in accordance with claim 15 further comprising a dedicated communications link, said first server system communicatively coupled to said second server system using said dedicated communications link.

* * * * *